United States Patent [19]

Hinachi et al.

[11] 4,008,473
[45] Feb. 15, 1977

[54] COLLISION PREDICTING OPERATION SYSTEM

[75] Inventors: Matatoyo Hinachi, Nagoya; Kazuo Oishi, Oobu; Toshiaki Kato, Nishio; Takeshi Matsui, Kariya; Takashi Yamada, Anjo, all of Japan

[73] Assignee: Nippon Soken, Inc., Nishio, Japan

[22] Filed: Jan. 14, 1974

[21] Appl. No.: 433,405

[30] Foreign Application Priority Data

Jan. 20, 1973 Japan .................. 48-8810

[52] U.S. Cl. .................. 343/7.5; 343/8; 343/112 CA; 343/9
[51] Int. Cl.² .................. G01S 9/44
[58] Field of Search .................. 343/5 PD, 8, 9, 7.5, 343/112 CA, 7 A

[56] References Cited

UNITED STATES PATENTS

| | | | |
|---|---|---|---|
| 3,308,458 | 3/1967 | Schulze | 343/8 |
| 3,407,403 | 10/1968 | Charlot, Jr. | 343/5 PD |
| 3,438,020 | 4/1969 | Lerner | 343/5 PD |
| 3,713,151 | 1/1973 | Kofsky | 343/8 |
| 3,805,263 | 4/1974 | Ueda | 343/5 PD |
| 3,921,169 | 11/1975 | Lazarchik et al. | 343/7.5 X |

*Primary Examiner*—T.H. Tubbesing
*Attorney, Agent, or Firm*—Cushman, Darby & Cushman

[57] ABSTRACT

There is provided a collision predicting operation system comprising a radar circuit whereby a reflected wave which has been radiated from an oscillator and encountered and reflected from a target is received and caused to interfere with the radiated wave to generate a doppler signal, an oscillator circuit group for generating a periodic wave synchronized with the doppler signal when the amplitude of the doppler signal is higher than a predetermined value and its frequency is within a predetermined range, means for changing the oscillation frequency of the oscillator in synchronization with the periodic wave, and means for detecting the polarity and the amount of change of the phase of the doppler signal changed by the frequency modulating means.

4 Claims, 25 Drawing Figures

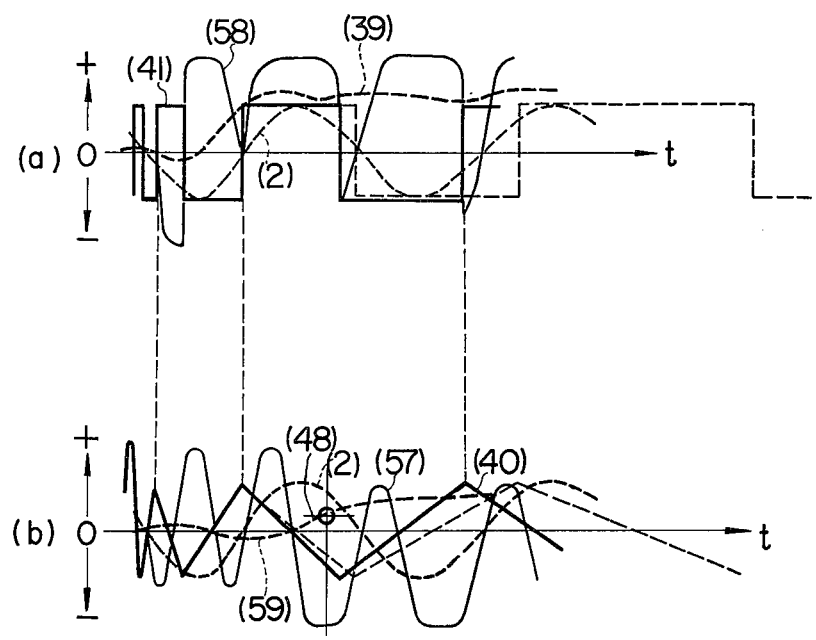
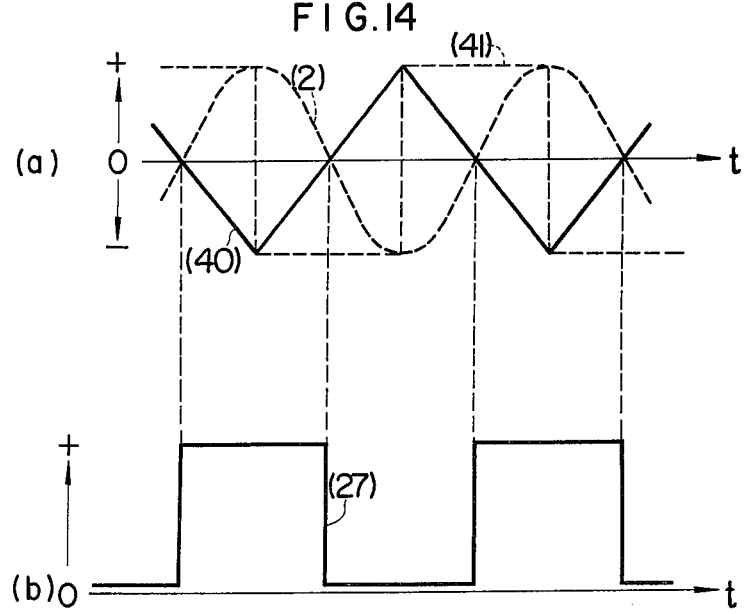

4,008,473

COLLISION PREDICTING OPERATION SYSTEM

BACKGROUND OF THE INVENTION

1. Field of the Invention

The present invention relates to a collision predicting operation system for an occupant protective device, such as, an air bag or sheet belt which is used with vehicles, particularly automotive vehicles.

2. Description of the Prior Art

A collision predicting operation system has been proposed in which a single wave signal is radiated into the air and its reflected wave from a target is received to produce a weal doppler signal which is reshaped, amplified and converted into a square wave through a band-pass filter, an operational amplifier and a Schmitt circuit to produce a rectangular doppler signal having a large amplitude, whereby in accordance with the timing determined by the large-amplitude doppler signal, the frequency of the wave signal is changed with time so that at least one of the change of polarity of the phase or the amount of change of the phase of the wave reflected from the target is detected to detect the distance of the target and at least one of the approaching or receding of the vehicle relative to the target is detected and thereby to detect the speed relative to the target, the distance to the target and the approaching or receding relative to the target thus performing the prediction of a collision.

A collision predicting operation system of the above type is subject to the disadvantage that the reshaping of the weak doppler system results in a voltage having a timing lag, and thus a timing error is introduced which adversely affects the accuracy in detecting the distance to the target and in detecting the approach or recession of the target.

SUMMARY OF THE INVENTION

With a view to overcoming the foregoing difficulty, it is an object of this invention to provide a collision predicting operation system of the above type wherein instead of determining the timing for changing the wave signal from a microwave oscillator according to a rectangular doppler signal produced by reshaping and amplifying a weal doppler signal, there is additionally provided an oscillator circuit group which is controlled so that when the amplitude of the weak doppler signal is higher than a predetermined value and the frequency of this doppler signal falls within a predetermined band, a periodic output wave synchronized with the doppler signal and having a sufficiently large amplitude is generated, whereas when the amplitude of the doppler signal is lower than the predetermined value or when the frequency of the doppler signal is beyond the range of the predetermined band no periodic output wave is generated, whereby after the detection of the target object an accurate timing for changing the wave signal from the microwave oscillator is determined according to the periodic output signal of the oscillator circuit group to ensure the improved accuracy for the detection of the distance of the target as well as the improved accuracy for the detection of the approaching or receding relative to the target.

In accordance with the above and other objects, the present invention comprises a collision predicting operation system comprising a radar circuit whereby a refected wave which has been radiated from an oscillator and encountered and reflected from a target is received and caused to interfere with the radiated wave to generate a doppler signal, an oscillator circuit group for generating a periodic wave synchronized with the doppler signal when the amplitude of the doppler signal is greater than a predetermined value and its frequency is within a predetermined range, and means for changing the oscillation frequency of the oscillator in synchronization with the periodic wave, whereby the polarity and the amount of change of the phase of the doppler signal changed by said means are detected. There is thus a remarkable advantage in that the timing of changing the oscillation frequency of the oscillator is made more accurate, and consequently the detection of the distance of a target located at a close approach as well as the approaching or receding motion of the target which are particularly essential with vehicles can be effected with greater accuracy and without any delay heretofore encountered with conventional systems, thereby rapidly and accurately determining and predicting the occurrence of a collision with the target.

BRIEF DESCRIPTION OF THE DRAWING

FIGS. 3 through 25 show an embodiment of a collision predicting operation system in accordance with the present invention in which:

FIG. 3 is a wiring diagram of the radar circuit.

FIG. 4 is a voltage-frequency characteristic diagram of the microwave oscillator.

FIG. 5 shows voltage waveforms generated at various parts of the system which are useful for explaining the operation of the radar circuit when a target is approaching.

FIG. 6 is a schematic diagram showing the radar circuit and the approaching movement of the target.

FIG. 7 shows voltage waveforms generated at various points in the system which are useful for explaining the operation of the radar circuit when the target is receding.

FIG. 8 is a schematic diagram showing the radar circuit and the receding motion of the target.

FIG. 9 is a block diagram showing the general construction of the system according to the present invention.

FIG. 10 is a circuit diagram of the oscillator circuit group alone.

FIGS. 11, 12, 13 and 14 show voltage waveforms generated at various points in the circuit which are useful for explaining the operation of the oscillator circuit group shown in FIG. 10.

FIG. 15 is a circuit diagram of the sawtooth wave generating circuit alone.

FIG. 16 shows voltage waveforms generated at various points in the circuit which are useful for explaining the operation of the sawtooth wave generating circuit shown in FIG. 15.

FIG. 17 is a circuit diagram of the relative state detecting circuit alone.

FIGS. 18, 19 and 20 show voltage waveforms generated at various points in the circuit which are useful for explaining the operation of the relative state detecting circuit shown in FIG. 17.

FIG. 21 is a circuit diagram showing the speed detecting circuit, danger decision circuit and actuator circuit.

FIGS. 22, 23, 24 and 25 are circuit diagrams showing second, third, fourth and fifth modifications of the principal portion of the oscillator circuit group.

DETAILED DESCRIPTION OF THE PRIOR ART

Figure 1:
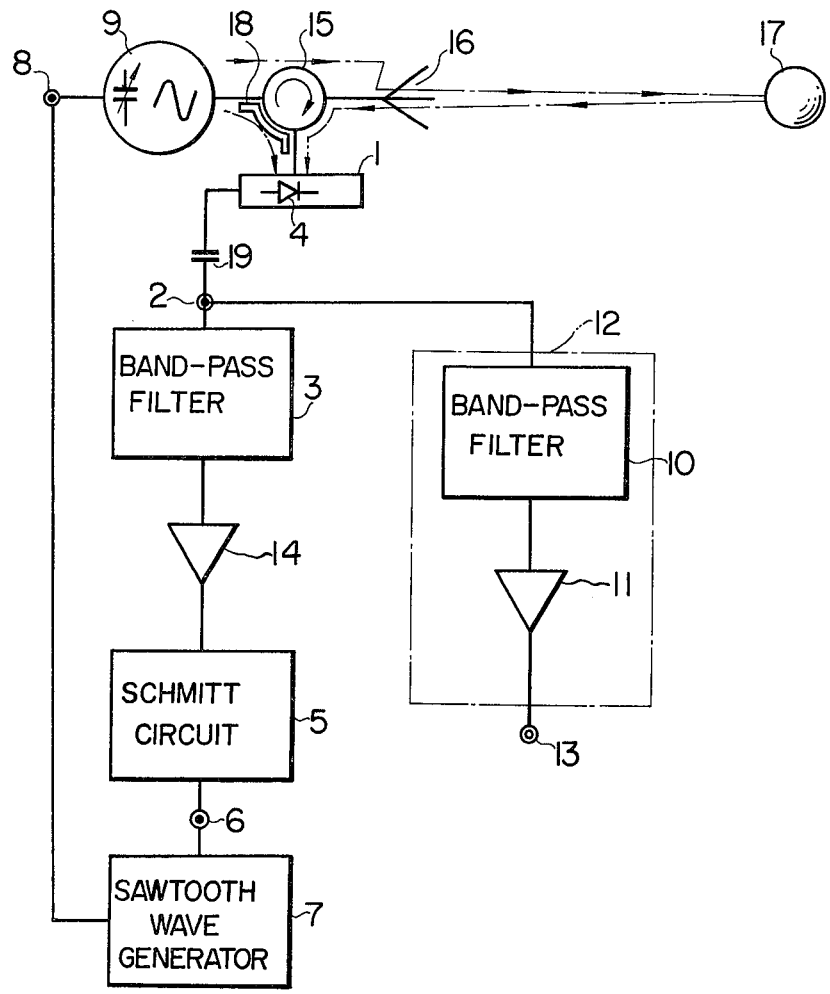
FIG. 1 is a block diagram showing a prior art collision predicting operation system.
Figure 2:
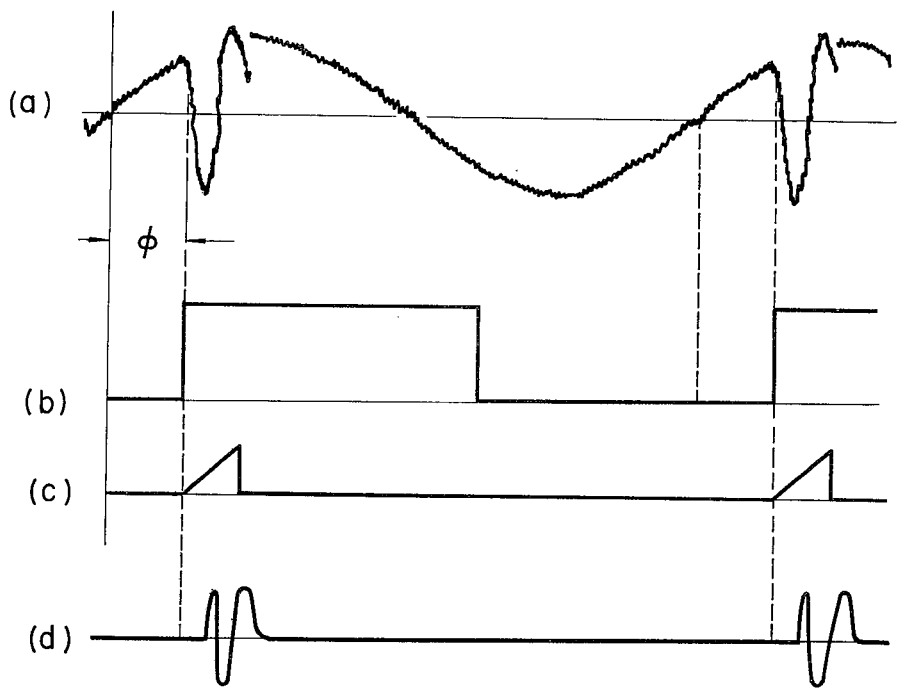
FIG. 2 shows voltage waveforms generated at various parts in the system of FIG. 1 which are useful for explaining the operation thereof.

Details of the prior art collision predicting operation system summarized above can be appreciated by reference to FIGS. 1 and 2 of the drawings. A disadvantage of this prior art system is that due to the frequency and phase characteristics of a band-pass filter 3 for reshaping the weak doppler signal generated at an output terminal 2 of a mixer 1 as shown in FIG. 2(a), the rectangular doppler signal generated at an output terminal 6 of a Schmitt circuit 5 involves a timing lag $\phi$ as shown in FIG. 2(b) with the result that the voltage having the timing lag as shown in FIG. 2(c) is generated at an output terminal 8 of a sawtooth wave generating circuit 7 and therefore the wave signal from a microwave oscillator 9 is changed with a wrong timing, whereby the erroneous distance and approaching or receding motion information wave shown in FIG. 2(d) is generated at an output terminal 13 of a reshaping amplifier 12 comprising a band-pass filter 10 and an operational amplifier 11 and this has the effect of extremely deteriorating the accuracy of detection of the distance to a target 17 as well as the accuracy of detection of the approaching or receding relative to the target 17.

DESCRIPTION OF THE PREFERRED EMBODIMENT

The present invention will now be described in greater detail with reference to the illustrated embodiment.

Figure 3:
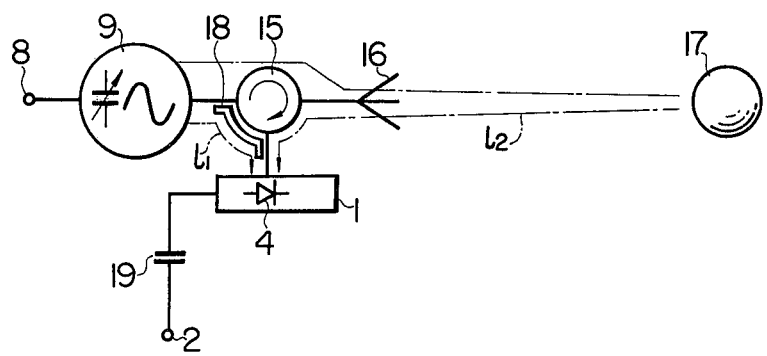

In the circuit diagram of FIG. 3 for explaining the principle of the radar circuit in a collision predicting operation system of this invention, component parts which are identical with those of the prior art system shown in FIG. 1 are designated by the same reference numerals. In FIG. 3, numeral 1 designates a mixer, 4 a mixer diode, 9 an electromagnetic microwave oscillator whose oscillation frequency is varied in accordance with the applied voltage at a terminal 8. Numeral 15 designates a circulator for separation between transmission and reception, 16 an antenna which is used for transmitting as well as for receiving wave signal, 18 a directional coupler for supplying a local wave to the mixer 1, 19 a DC blocking capacitor.

Figure 4:
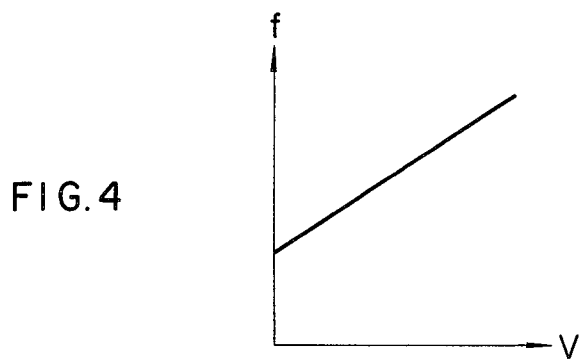

The above radar circuit has the characteristic shown in FIG. 4 between the frequency modulating applied voltage V at the terminal 8 and the frequency $f$ of the wave output of the microwave oscillator 9.

With the construction described above, the radar circuit operates as follows. When the microwave oscillator 9 starts oscillating, its output electromagnetic wave signal is radiated to the outside from the antenna 16 through the circulator 15. The reflected wave of the radiated wave encountered and reflected from a target object 17 is supplied through the antenna 16 and the circulator 15 to the mixer 1 where it is mixed and detected. On the other hand, a portion of the generated output wave signal of the microwave oscillator 9 is supplied as a local wave to the mixer 1 through the directional coupler 18. In this case, if $l_1$ represents the line length of the local wave supplied from the microwave oscillator 9 to the mixer 1 by way of the directional coupler 18 and $l_2$ represents the line length of the reflected wave which has been generated by the microwave oscillator 9, radiated from the antenna 16 through the circulator 15 and supplied back to the mixer 1 through the antenna 16 and the circulator 15 after its encounter and reflection from the target 17, the difference in line length between the two waves produces a phase difference $\Delta$ between the local wave and the reflected wave given by the following equation (1):

$$\text{Phase difference } \Delta = 2\pi \frac{l_2}{\lambda} - 2\pi \frac{l_1}{\lambda} \text{ (radians)} \tag{1}$$

where $\lambda$ is the wavelength of wave. In accordance with the phase difference $\Delta$, the output or doppler signal from the mixer 1 shows the maximum value when the phase difference $\Delta$ is an integral multiple of $2\pi$ radians ($n \cdot 2\pi$) and it shows the minimum value when the phase difference $\Delta$ is $n \cdot 2\pi + \pi$ radians. Then, if the target 17 moves a distance of $\lambda/2$ toward the antenna 16, the line length $l_2$ of the reflected wave decreases by the wavelength $\lambda$ and hence the phase difference $\Delta$ decreases by $2\pi$ radians thus producing a doppler signal for one period as the output of the mixer 1.

Figure 5:
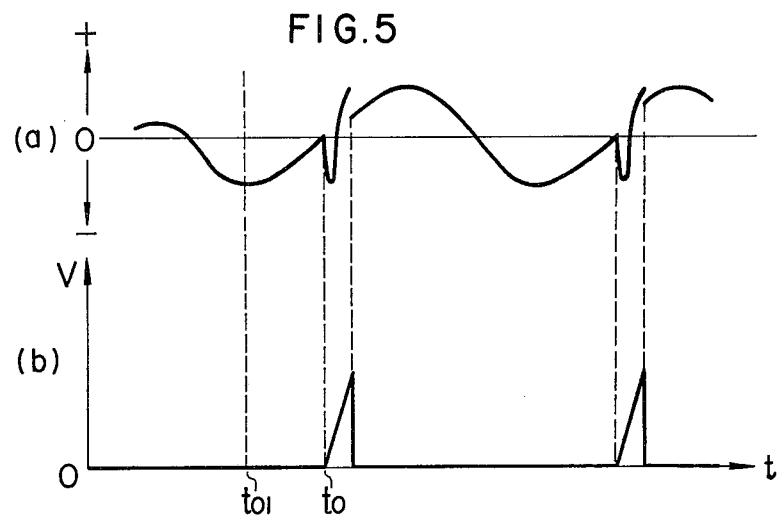

This operation of generating doppler signal will be described first with reference to FIGS. 5 and 6 for the case where the target 17 is moving toward the antenna 16.

Figure 6:
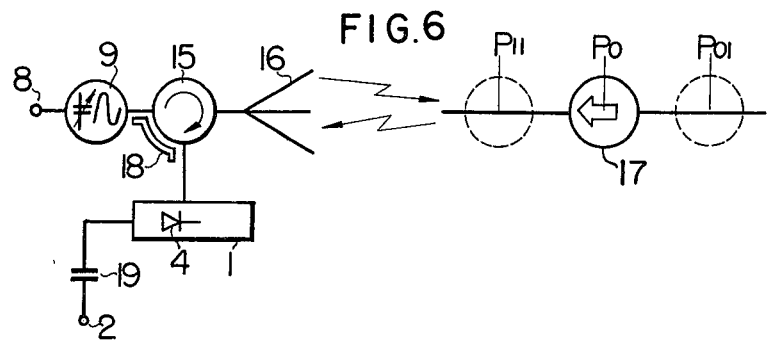

When the target 17 is located at a point $P_{01}$ in FIG. 6 where the doppler signal shown in FIG. 5(a) and generated at the output terminal 2 of the DC blocking capacitor 19 has the minimum value at a time $t_{01}$ and this target 17 continues to move toward the position of point $P_{11}$ in FIG. 6 where the doppler signal has the maximum value, the line length $l_2$ of the reflected wave gradually decreases and hence the phase difference $\Delta$ between the local wave and the reflected wave continues to decrease. In this case, circuits are connected across the terminals 2 and 8 so that when the target 17 reaches a point $P_0$ in FIG. 6 at a time $t_o$ where the value of the doppler signal level shows zero, the signal shown in FIG. 5(b) is generated to rapidly and linearly increase with time the frequency modulating voltage at the terminal 8 which is applied to the microwave oscillator 9, and in this way from the moment when the time $t_o$ is reached, the wavelength of the wave signal from the microwave oscillator 9 is linearly and rapidly decreased with time.

In this case, since it is designed so that the line length $l_1$ of the local wave is sufficiently short as compared with the line length $l_2$ of the reflected wave, in accordance with the above equation (1), the phase difference $\Delta$ between the local wave and the reflected wave is reversed and it is now increased quickly with the amount of the increase being proportional to the distance from the antenna 16 to the target 17. With the operation described above, the doppler signal generated at the terminal 2 and the frequency modulating voltage applied to the terminal 8 during the movement of the target 17 toward the antenna 16 take respectively the waveforms shown in FIGS. 5(a) and 5(b).

Figure 7:
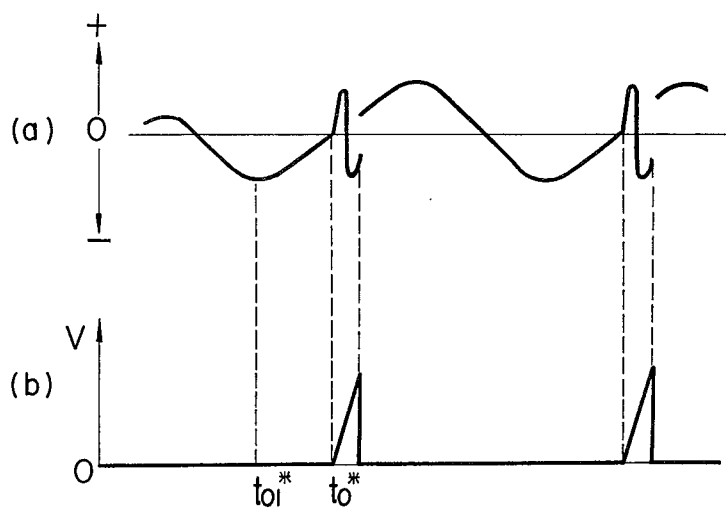
Figure 8:
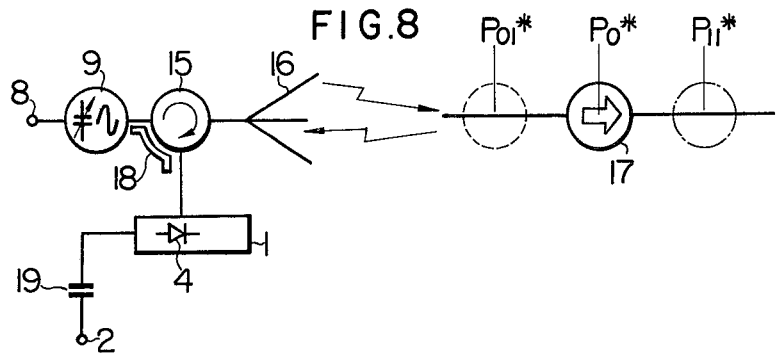

The operation of the radar circuit when the target 17 is moving away from the antenna 16 will be described with reference to FIGS. 7 and 8. When the target 17 is located at a point $P_{01}^*$ in FIG. 8 where the doppler signal shown in FIG. 7(a) and generated at the terminal 2 has the minimum value at a time $t_{01}*$ and then the target 17 continues to move toward the position of a point $P_{11}*$ in FIG. 8 where the doppler signal has the maximum value, the line length $l_2$ of the reflected wave increases gradually and hence the phase difference $\Delta$ between the local wave and the reflected wave continuously increases. In this case, the circuits are connected across the terminals 2 and 8 so that when the target 17 reaches a point $P_0*$ in FIG. 8 at a time $t_o*$ where the value of the doppler signal level shows zero, the signal shown in FIG. 7(b) is generated to rapidly and linearly increase with time the frequency modulating voltage at the terminal 8 which is applied to the microwave oscillator 9, and in this way the wavelength of the wave signal from the microwave oscillator 9 is rapidly and linearly decreased with time from the moment when the time $t_o*$ is reached. In this case, in accordance with an operation similar to the above-described operation during the approaching movement of the target 17, the phase difference $\Delta$ between the local wave and the reflected wave is increased rapidly and the amount of this increase is proportional to the distance from the antenna 16 to the target 17. With this operation, the doppler signal generated at the terminal 2 and the frequency modulating voltage applied to the terminal 8 during the movement of the target 17 away from the antenna 16 take respectively the waveforms shown in FIGS. 7(a) and 7(b).

Figure 9:
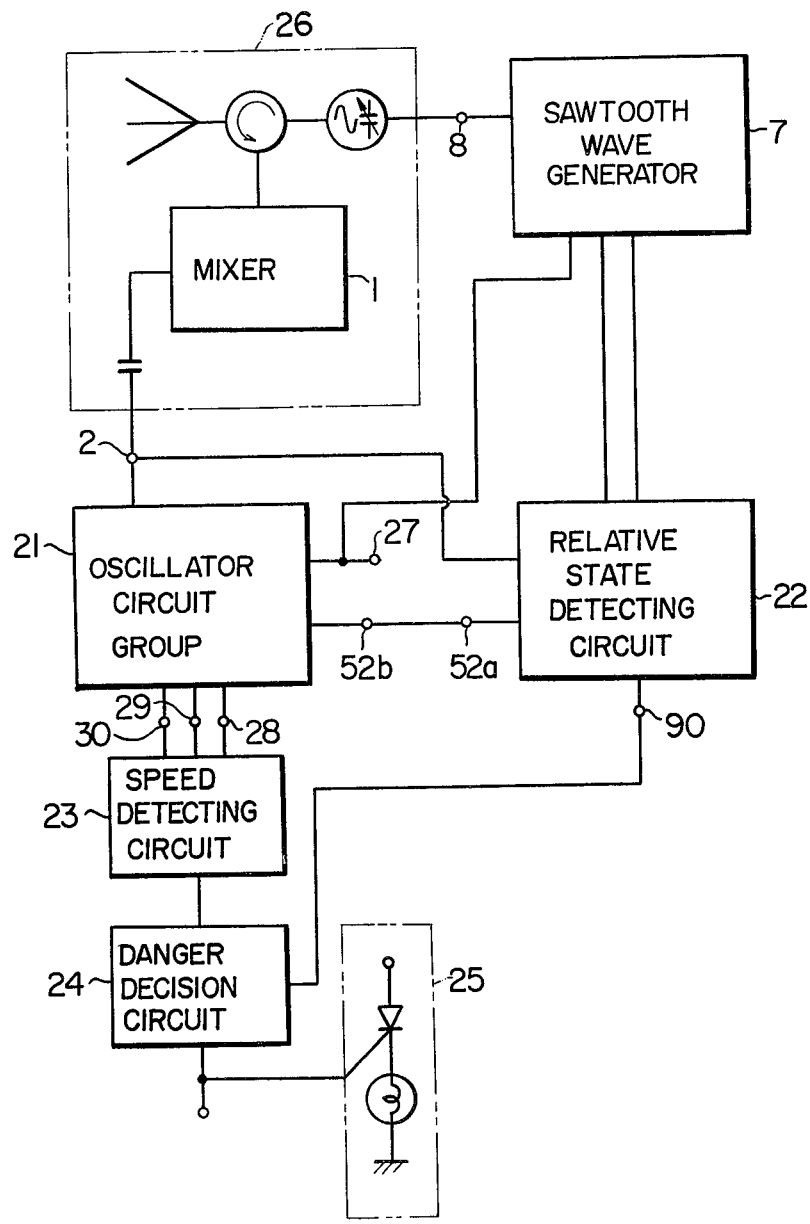

In FIG. 9, there is shown a block diagram showing an exemplary embodiment of the system of this invention for performing the above-described operations. In FIG. 9, numeral 21 designates an oscillator circuit group for receiving the doppler signal from the output terminal 2 of the previously mentioned radar circuit 26 and generating an output oscillation signal to direct the operation of a sawtooth wave generating circuit 7 with accurate timing. Numeral 23 designates a speed detecting circuit connected to speed information terminals 28, 29 and 30 of the oscillator circuit group 21 to detect whether the speed is higher than a critical speed, 22 a relative state detecting circuit for analyzing the distance and approaching or receding motion information contained in the doppler signal to detect whether the distance is within a critical range and the target is approaching, 24 a danger decision circuit connected to the relative state detecting circuit 22 and the speed detecting circuit 23 to determine whether there is a danger of collision in accordance with the speed information, distance information and approaching or receding information, 25 an actuator circuit connected to the danger decision circuit 24 to actuate a protective device.

Each of the above-mentioned blocks will now be described in greater detail.

Figure 10:
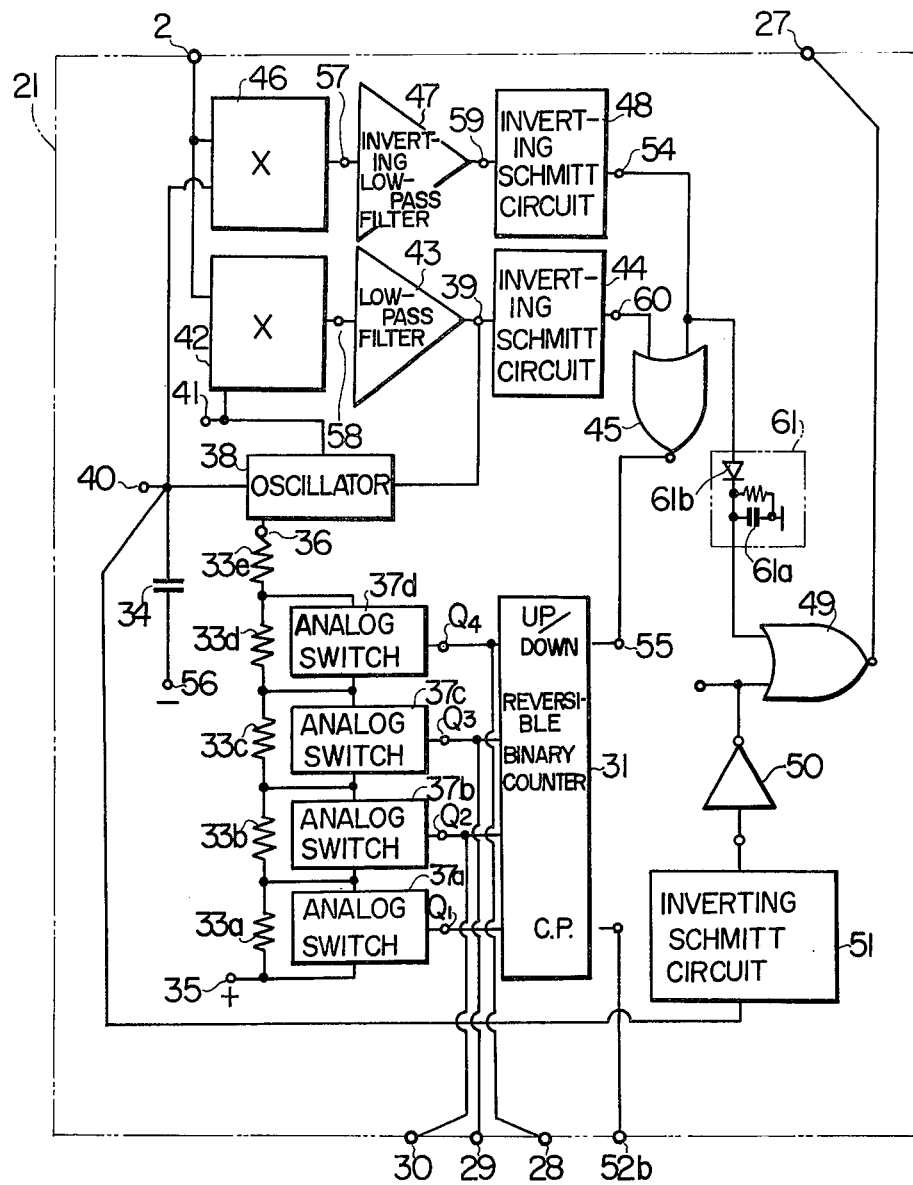
Figure 11:
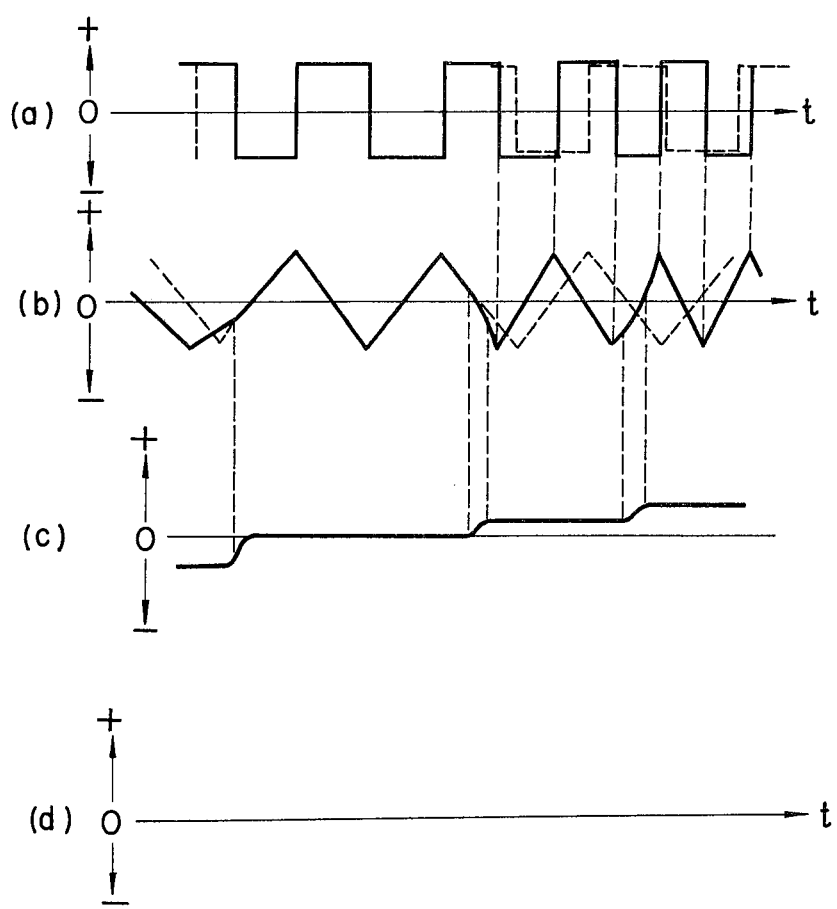

The oscillator circuit group 21 will be described first with reference to FIGS. 10, 11, 12, 13 and 14. In FIG. 10 showing a detailed circuit diagram of the oscillator circuit group 21 alone, numeral 31 designates a reversible binary counter comprising the RCA NO. CD4029A, 37a, 37b, 37c and 37d analog switches each comprising the RCA NO. CD4016A which respectively short-circuit resistors 33a, 33b, 33c and 33d respectively connected across the input and output terminals of the respective analog switches in accordance with voltage levels at output terminals $Q_1$, $Q_2$, $Q_3$ and $Q_4$ of the binary counter 31. Numeral 38 designates an oscillator whose fundamental frequency is determined by the resistance value of a resistor network comprising the analog switches 37a, 37b, 37c and 37d, the resistors 33a, 33b, 33c and 33d and a resistor 33e and the capacitance of a capacitor 34, and in which the oscillation frequencies of the frequencies generated respectively at terminals 40 and 41 and being 90° out of phase with each other become higher or lower than the fundamental frequency depending on the value of the voltage generated at a terminal 39. Numeral 42 designates a multliplier for multiplying the frequency at the terminal 2 and the frequency at the terminal 41, 43 a low-pass filter for reshaping the output wave of the multiplier 42, and the closed circuit composed of the oscillator 38, the multiplier 42 and the low-pass filter 43 comprises the SIGNETICS NO. SE565. Numeral 44 designates an inverting Schmitt circuit for generating a low level voltage at a terminal 60 when the value of the voltage at the terminal 39 is higher than zero, 46 a multiplier comprising the MOTOROLA NO. MC1596 for multiplying the frequency at the terminal 40 and the frequency at the terminal 2, 47 an inverting low-pass filter for reshaping and changing the sign of the output wave of the multiplier 46, 48 and 51 inverting Schmitt circuits, 45 and 49 NOR gates, 50 an inverter, 61 a delay circuit, 61a a capacitor, 61b a diode.

With the construction described above, the operation of the oscillator circuit group 21 will be described in greater detail. For the purpose of explaining the operation of the oscillator 38, its operation that takes place when a clock pulse terminal 52b of the reversible binary counter 31 is disconnected from a clock pulse generating terminal 52a for generating clock pulses from the relative state detecting circuit 22 of FIG. 9, will be described first. As a result of the disconnection between the terminals 52a and 52b, the resistance value between a terminal 35 supplied with a positive voltage and a terminal 36 of the oscillator 38 shows a constant so that in the vicinity of the fundamental frequency determined by this resistance value and the capacitance of the capacitor 34 connected to a terminal 56 to which a nagative voltage is supplied, the frequencies shown respectively in FIGS. 11(a) and 11(b) are generated respectively at the output terminals 41 and 40 of the oscillator 38 in accordance with the potential at the terminal 39 shown in FIG. 11(c). Further, FIG. 11(d) shows the voltage waveform generated at the clock pulse terminal 52b, and as shown in FIGS. 11(a) and 11(b), the frequencies of the periodic waves generated respectively at the terminals 41 and 40 coincide with the fundamental frequency when the value of the potential at the terminal 39 shown in FIG. 11(c) is zero.

Figure 12:
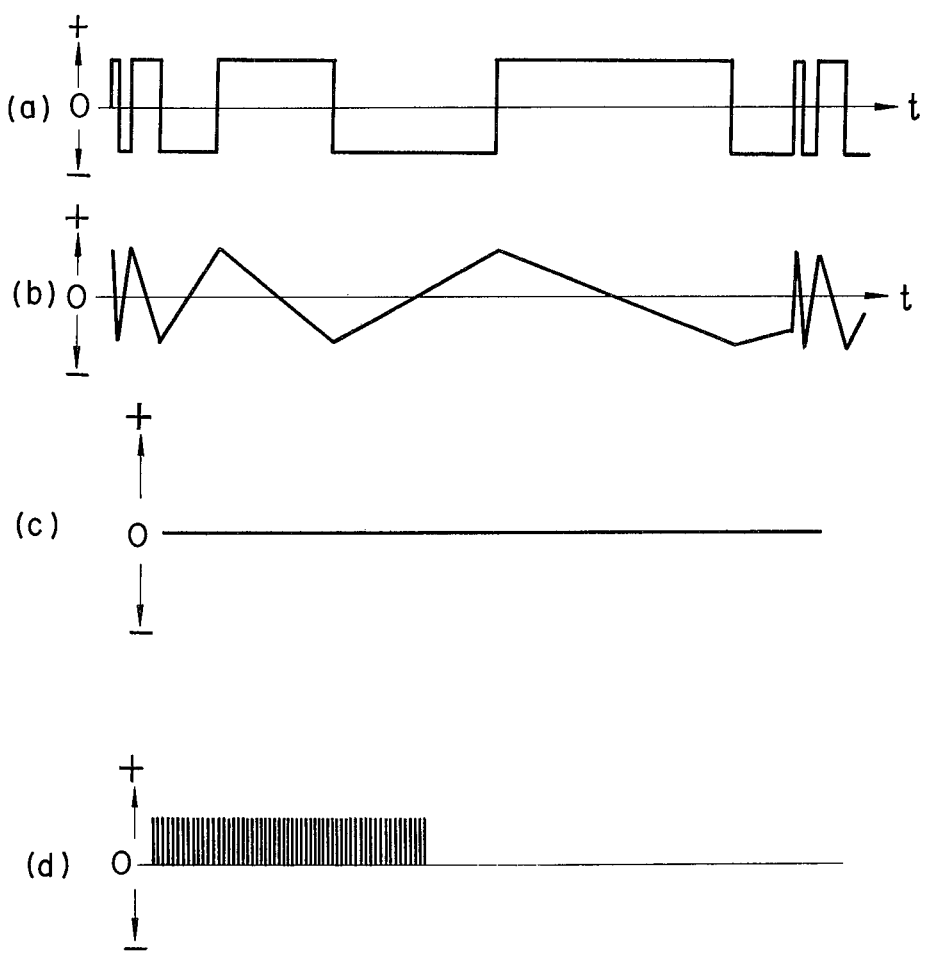

Next, the operation of the oscillator 38 when a short-circuit is established between the terminals 52a and 52b will be explained with reference to FIG. 12. As a result of the connection between the terminals 52a and 52b, clock pulses are supplied to the reversible binary counter 31, and if the amplitude of the doppler signal at the terminal 2 is low enough, the output of the multiplier 42 is practically at a zero potential and the output of the low-pass filter 43 is also practically at a zero potential. Further, the output of the multiplier 46 is also practically at a zero potential and the output of the inverting low-pass filter 47 is also practically at a zero potential thus failing to reach the Schmitt level of the inverting Schmitt circuit 48. Consequently, the potential at an output terminal 54 of the inverting Schmitt circuit 48 goes to a high level and the potential at a forward-barckward command terminal 55 of the reversible binary counter 31 connected to the output of the NOR gate 45 connected to the terminal 54 goes to a low level thus causing the reversible binary counter 31 to count in the reverse direction. This decreases the resistance value of the resistor network comprising the resistors 33a, 33b, 33c, 33d and 33e and the analog switches 37a, 37b, 37c and 37d and hence the frequencies of the periodic waves generated at the output terminals 41 and 40 of the oscillator 38 decrease with time. In this case, the periodic waves generated respectively at the output terminals 41 and 40 respectively have the waveforms shown in FIGS. 12(a) and 12(b), and the voltage waveforms generated respectively at the terminals 39 and 52b are shown in FIGS. 12(c) and 12(d).

The operation of the oscillator circuit group 21 under the above-described scanning conditions will be described with reference to FIGS. 13 and 14. When the doppler signal (2) shown in FIGS. 13(a) and 13(b) is applied to the terminal 2, the product signal (58) shown in FIG. 13(a) is generated at the terminal 58 of the multiplier 42 and it is reshaped by the low-pass filter 43 to generate the control signal (39) shown in FIG. 13(a) at the terminal 39. The periodic wave (41) shown in FIG. 13(a) which is generated by the control signal (39) at the terminal 41 is drawn in toward the frequency of the doppler signal (2) generated at the terminal 2 from the fundamental frequency corresponding to the momentarily increasing resistance value of the resistor network. On the other hand, as the frequency of the periodic wave (40) of FIG. 13(b) generated at the terminal 40 is drawn in toward the frequency of the doppler signal (2) by the above-mentioned drawing action, the product signal (57) of FIG. 13(b) generated at an output terminal 57 of the multiplier 46 changes in the similar manner as the product signal (58). Consequently, the amplitude of the signal (59), FIG. 13(b), generated at an output terminal 59 of the inverting low-pass filter 47 exceeds the Schmitt level (48) of the inverting Schmitt circuit 48 so that the voltage at the output terminal 54 of this inverting Schmitt circuit 48 goes to the low level and this low level signal is applied to the delay circuit 61 and the NOR gate 45. The voltage at the other input terminal 60 of the NOR gate 45 is caused to go to the low level by the inverting Schmitt circuit 44 having a zero potential Schmitt level when the angular phase lead of the periodic wave (41) of FIG. 13(a) generated at the terminal 41 relative to the doppler signal (2) generated at the terminal 2 is less than 90°. When this occurs, the voltage at the command terminal 55 goes to the high level and thus the reversible binary counter 31 counts in the forward direction causing the fundamental frequency of the oscillator 38 to approach the frequency of the doppler signal (2).

Thereafter, as the fundamental frequency of the oscillator 38 approaches the frequency of the doppler signal (2), the above-mentioned angular phase lead approaches 90° and eventually it becomes greater than 90°. When this occurs, the control voltage at the terminal 39 becomes negative and thus the reversible binary counter 31 is caused to count in the reverse direction contrary to the case shown in FIG. 13. Consequently, the oscillator 38 is locked in the condition where the control voltage is at a zero potential, that is, the phase of the periodic wave at the terminal 41 leads the doppler signal at the terminal 2 by 90° and the phase of the periodic wave at the terminal 40 leads the doppler signal at the terminal 2 by 180°. The waveforms of the doppler signal at the terminal 2, the periodic wave at the terminal 40 and the periodic wave at the terminal 41 in this locked condition are shown respectively at (2), (40) and (41) in FIG. 14(a). Further, the zero level of the periodic wave (40) of FIG. 14(a) generated at the terminal 40 is detected by the inverting Schmitt circuit 51 and it is then applied to one input terminal of the NOR gate 49 through the inverter 50. The potential at the other input terminal of the NOR gate 49 is maintained at the high level by the action of the delay circuit 61 until the locked condition is established thereby controlling to prevent the signal from the inverting Schmitt circuit 51 from being delivered to a terminal 27. The voltage waveform at the terminal 27 during the locked period after the expiration of the delay time of the delay circuit 61 is shown at (27) in FIG. 14(b). Further, since the binary number generated at the output terminals $Q_1$, $Q_2$, $Q_3$ and $Q_4$ of the reversible binary counter 31 during the locked period corresponds to the frequency of the doppler signal at the terminal 2, the output terminals $Q_2$, $Q_3$ and $Q_4$ are connected respectively to the terminals 30, 29 and 28 of the speed detecting circuit 23 to provide speed information.

Figure 15:
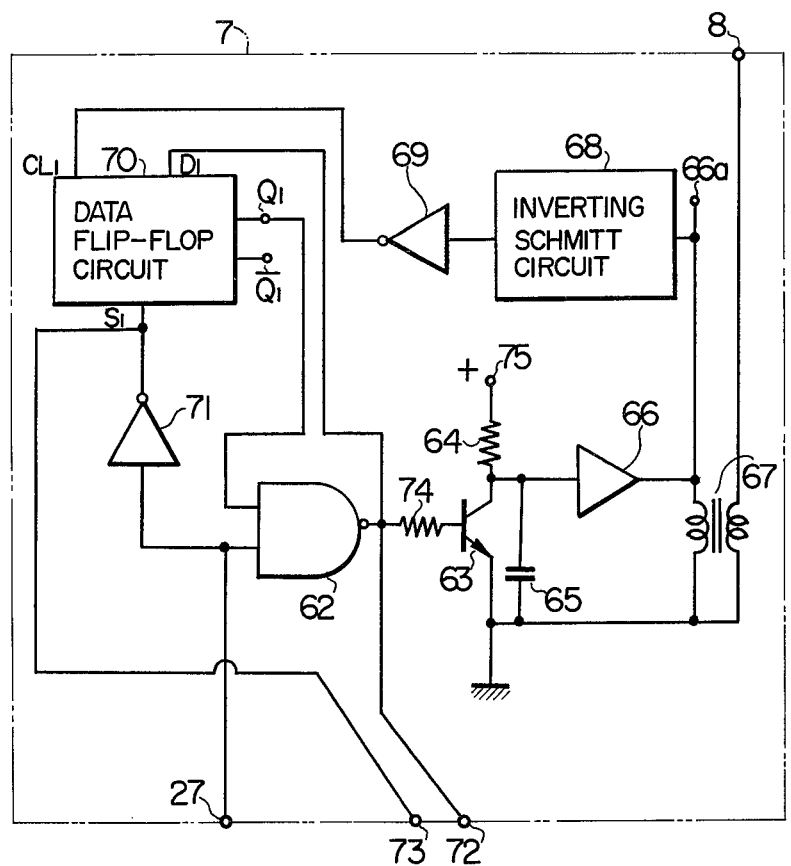
Figure 16:
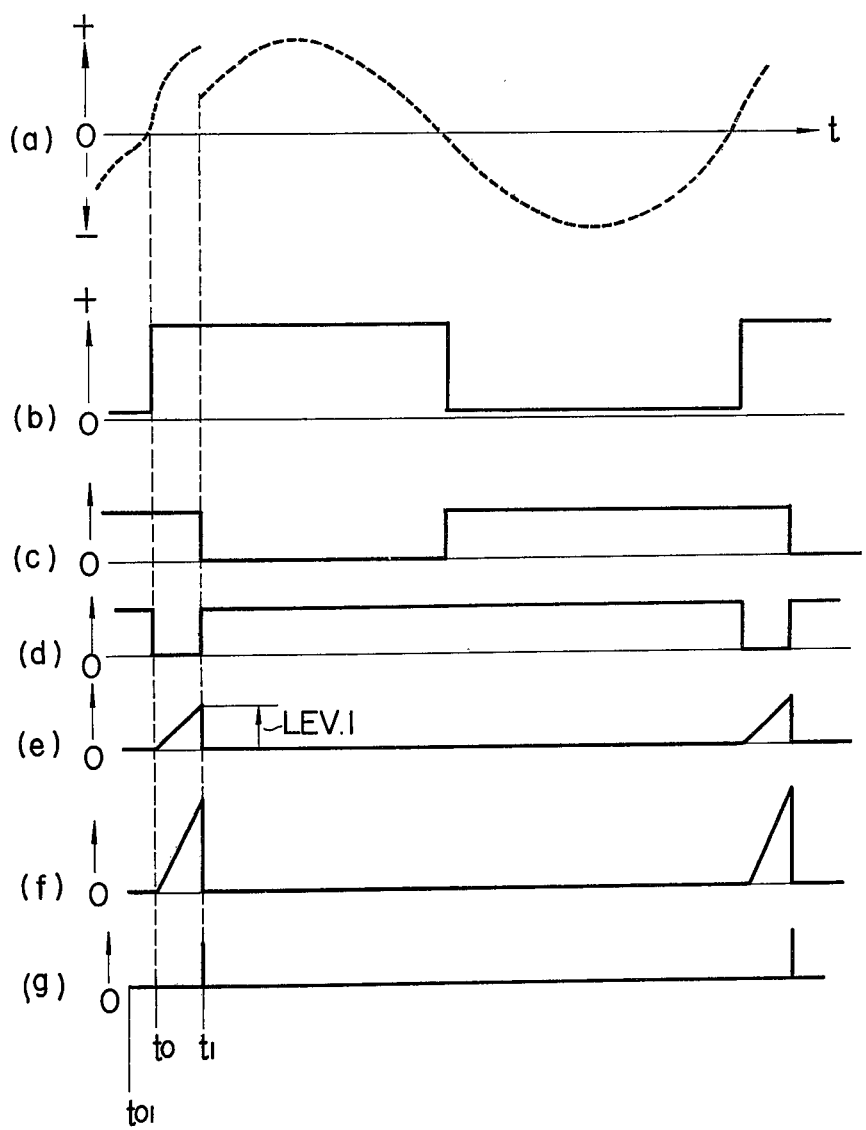

The sawtooth wave generating circuit 7 operated by the signal at the terminal 27 will be described with reference to FIGS. 15 and 16. In FIG. 15, numeral 62 designates a NAND gate, 63 a transistor connected to the NAND gate 62 through a base resistor 74, 64 a collector resistor connected between the collector of the transistor 63 and a positive power supply terminal 75 to which positive voltage is supplied so that a charging current flows to a capacitor 65 when the transistor 63 is cut off. Numeral 66 designates an amplifier for amplifying the voltage across the capacitor 65 to supply a primary current to a boosting transformer 67, 68 an inverting Schmitt circuit for detecting the potential at an output terminal 66a of the amplifier 66, 69 and 71 inverters, 70 a data flip-flop circuit comprising the RCA NO. CD4013A.

With the construction described above, the operation of the sawtooth wave generating circuit 7 will be described with reference to FIG. 16. When the signal shown in FIG. 16(b) which is synchronized with the doppler signal of FIG. 16(a) generated at the terminal 2 is on the terminal 27, at a time $t_{01}$ when the voltage of the signal shown in FIG. 16(b) is at the low level, a high level voltage is applied to a set terminal $S_1$ of the data flip-flop circuit 70 through the inverter 71 so that the voltage at an output terminal $Q_1$ of the data flip-flop circuit 70 is at the high level as shown in FIG. 16(c). However, since the potential at the terminal 27 is at the low level, the voltage at an output terminal 72 of the NAND gate 62 is at the high level as shown in FIG. 16(d) and therefore the transistor 63 short-circuits the capacitor 65 across the terminals thereof. Thereafter, when the voltage value of the signal at the terminal 27 goes to the high level as shown in FIG. 16(b), the voltage at the output terminal 72 of the NAND gate 62 goes to the low level as shown in FIG. 16(d) with the result that the transistor 63 is cut off and the voltage at a data terminal $D_1$ of the data flip-flop circuit 70 goes to the low level. Further, as a result of the nonconduction of the transistor 63, the voltage on the capacitor 65 increases linearly and rapidly with time by the charging action through the power supply terminal 75 and the resistor 64. The voltage on the capacitor 65 is amplified by the amplifier 66 and the voltage at the terminal 66a increases as shown in FIG. 16(e) to supply a primary current to the boosting transformer 67. Consequently, the voltage at the terminal 8 also rises rapidly and linearly with time as shown in FIG. 16(f). When the rising voltage at the terminal 66a shown in FIG. 16(e) eventually reaches the Schmitt level LEV. 1 of the inverting Schmitt circuit 68 at a time $t_1$, the voltage at a clock terminal CL1 of the data flip-flop circuit 70 is caused through the inverter 69 to go to the high level as shown in FIG. 16(g) so that the voltage at the output terminal $Q_1$ of the data flip-flop circuit 70 goes to the low level as shown in FIG. 16(c) and the voltage at the output terminal 72 of the NAND gate 62 goes to the high level as shown in FIG. 16(d). Consequently, at the time $t_1$, the transistor 63 short-circuits the terminals of the capacitor 65 with the result that the voltage at the terminal 8 rapidly drops to the zero potential as shown in FIG. 16(f) to generate a sawtooth wave thereat. When the half period of the doppler signal shown in FIG. 16(a) passes from the time $t_0$, the voltage at the terminal 27 goes to the low level as shown in FIG. 16(b) and thus the data flip-flop circuit 70 is reset and the voltage at its output terminal $Q_1$ goes to the high level thus making it ready to operate in the similar manner as the operation after the time $t_0$ when the voltage at the terminal 27 again goes to the high level.

Figure 17:
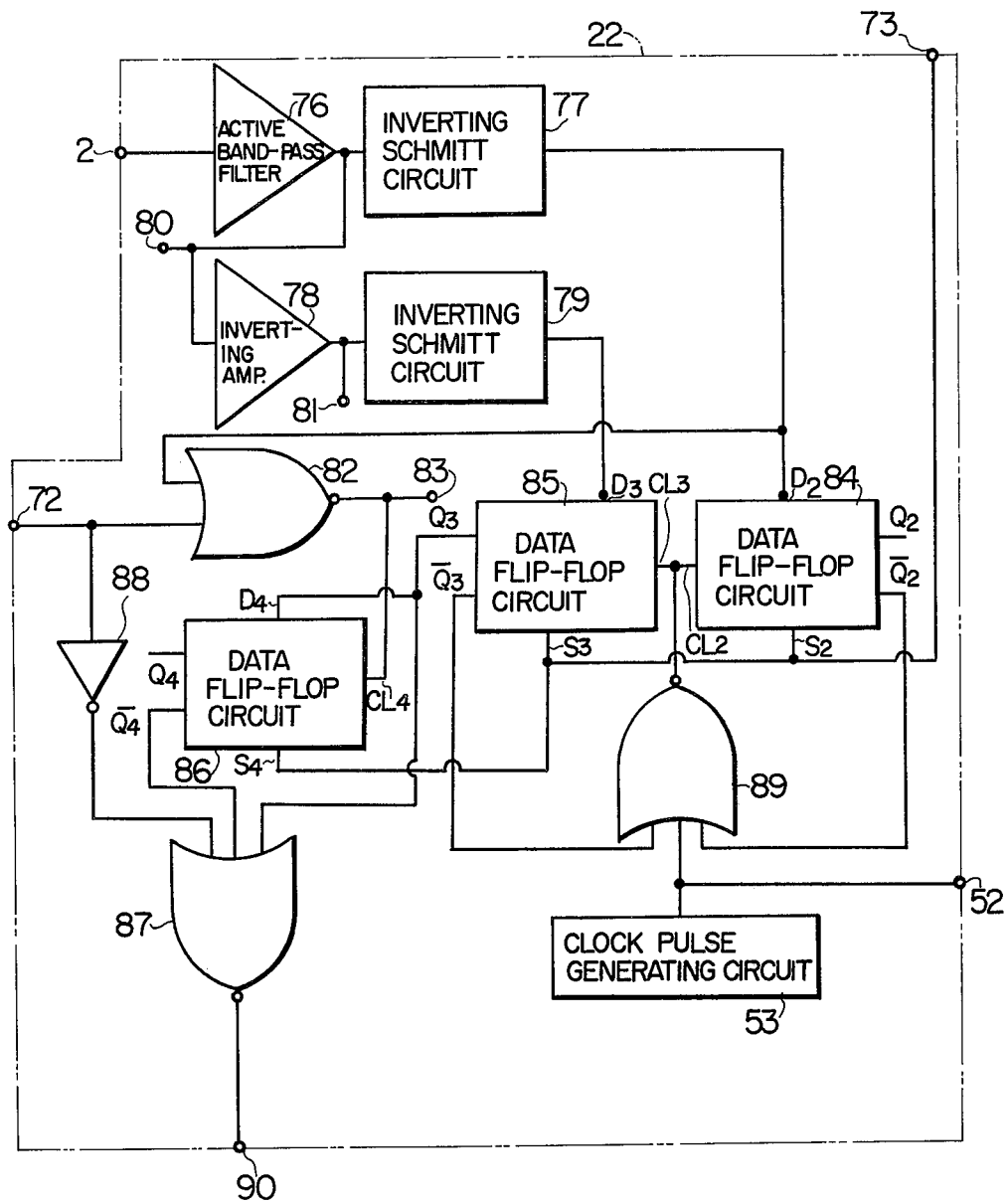

Next, the relative state detecting circuit 22 for detecting the distance as well as the approaching or receding motion of a target from the doppler signal will be described with reference to FIGS. 17, 18, 19 and 20. Referring first to FIG. 17 showing a detailed circuit diagram of the relative state detecting circuit 22 alone, numeral 76 designates an active band-pass filter connected to the terminal 2 to which a doppler signal is inputted, 77 and 79 inverting Schmitt circuits, 78 an inverting amplifier whose amplification degree is unity, 82 a two-input NOR gate, 87 and 89 three-input NOR gates, 88 an inverter, 84, 85 and 86 data flip-flop circuits which are identical with the data flip-flop circuit 70 in the sawtooth wave generating circuit 7, and 53 a clock pulse generating circuit. Each of the circuits 84, 85 and 86 is arranged to produce a high level voltage at its output terminal Q when a high level voltage is inputted to its set terminal S, and when a high level voltage is inputted at its clock terminal CL a voltage which is being inputted at that moment at its data terminal D appears at its output terminal Q. It should be noted that the voltage level at a terminal $\overline{Q}$ has an inverse relation to that at the terminal Q.

Figure 19:
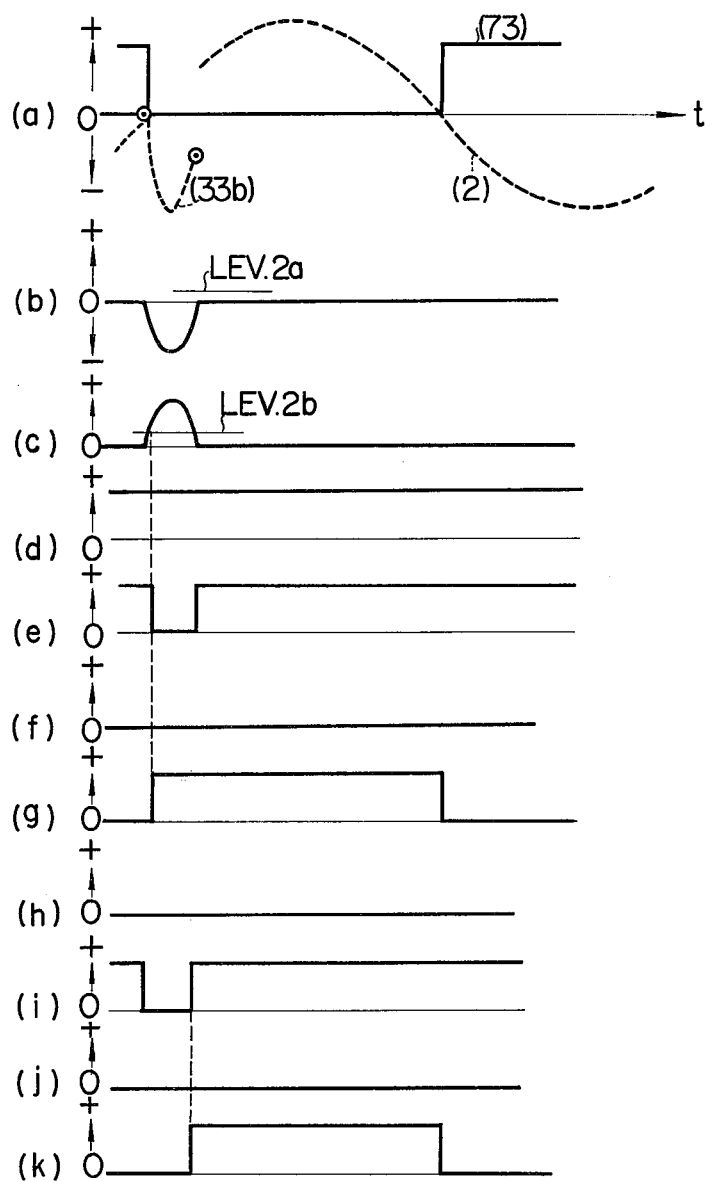
Figure 20:
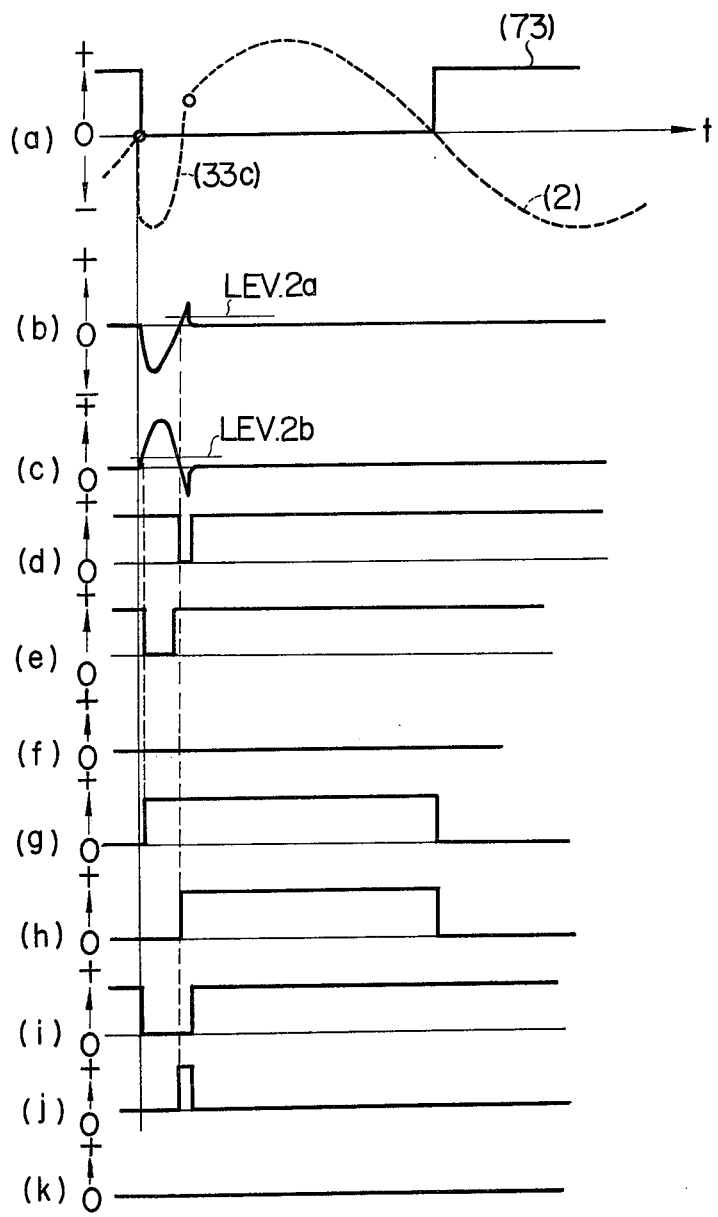

With the construction described above, the operation of the relative state detecting circuit 22 will be described with reference to FIGS. 18, 19 and 20.

Figure 18:
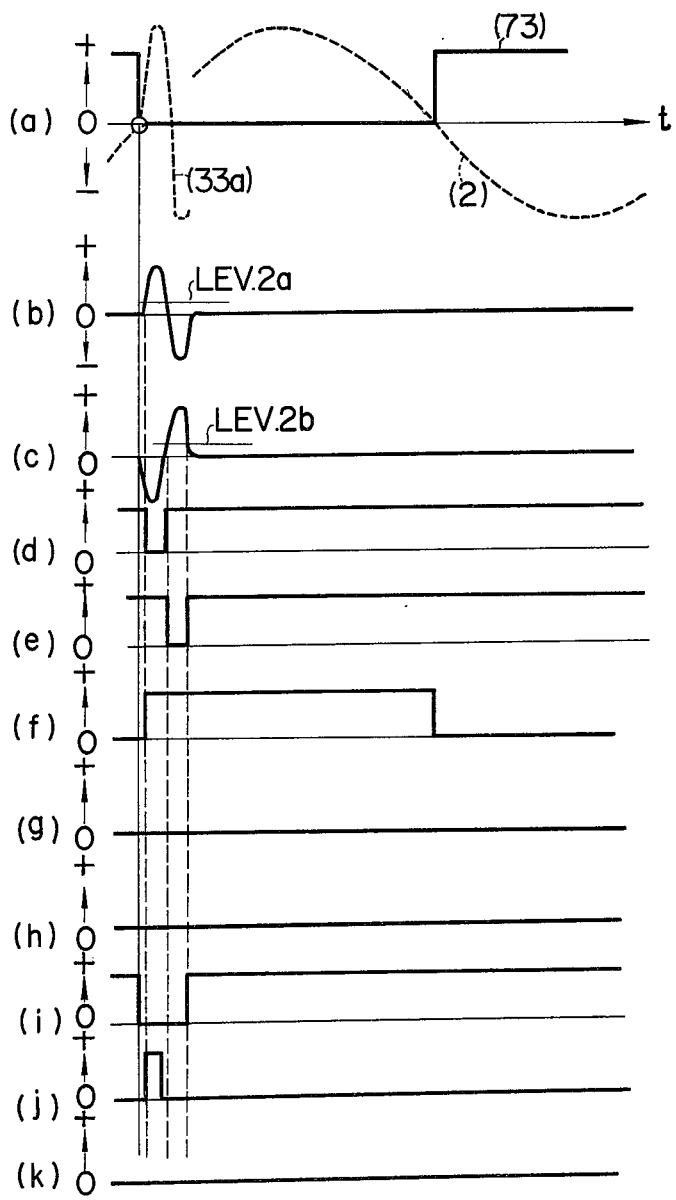

When the operation of the sawtooth wave generating circuit 7 causes the frequency of the wave signal generated from the microwave oscillator 9 to increase linearly and rapidly with time in accordance with the sawtooth wave, a doppler signal (2) is generated at the output terminal 2 of the radar circuit 26 and this doppler signal includes the distance and approaching or receding motion information wave as shown at (33a), (33b) or (33c) in FIG. 18(a), 19(a) or 20(a). The operation of the circuit during the receding motion of the target 17 moving away from the antenna 16 will be described with reference to FIG. 18. In this case, the distance and approaching or receding motion information wave (33a) shown in FIG. 18(a) is generated and this information wave (33a) is reshaped and amplified by the active band-pass filter 76 to generate the signal wave shown in FIG. 18(b) at a terminal 80. At the same time, the sign of the signal wave shown in FIG. 18(b) is inverted by the unity gain inverting amplifier 78 to generate the signal wave shown in FIG. 18(c) at a terminal 81. Consequently, firstly the voltage of the signal wave of FIG. 18(b) generated at the terminal 80 exceeds a Schmitt level LEV. 2a of the inverting Schmitt circuit 77 to cause the voltage at a data terminal $D_2$ of the data flip-flop circuit 84 to go to the low level as shown in FIG. 18(d). Thereafter, similarly the voltage of the signal wave shown in FIG. 18(c) exceeds the Schmitt level LEV. 2b to cause the voltage at a data terminal $D_3$ of the data flip-flop circuit 85 to go the low level as shown in FIG. 18(e). At this time, the voltage at a terminal 73 connected to the sawtooth wave generating circuit 7 is at the low level as shown at (73) in FIG. 18(a). While a high level voltage is applied to the terminal 73, all the flip-flops 84, 85 and 86 have been set and thus each of the terminals $\overline{Q}_2$, $\overline{Q}_3$ and $\overline{Q}_4$ has been at the low level. Therefore, the clock pulses from the clock pulse generating circuit 53 are applied to the clock terminals $CL_2$ and $CL_3$ of the data flip-flop circuits 84 and 85 through the NOR gate 89. The data flip-flop circuit 84 generates at its output terminal $Q_2$ the same low level voltage as that at its data terminal $D_2$ to cause the voltage at its output terminal $Q_2$ to go to the high level as shown in FIG. 18(f) and it is applied to the NOR gate 89 and the NOR gate 89 interrupts the application of clock pulses to the data flip-flop circuits 84 and 85.

A low level voltage is applied to the data terminal $D_3$ of the data flip-flop 85 after the voltage level applied to the data terminal $D_2$ of the data flip-flop circuit 84 has changed from the low level to the high level. As the result, the data flip-flop circuit 85 generates at its output terminal $Q_3$ the high level voltage which is being inputted to its data terminal $D_3$ and thus generates the low level voltage at its output terminal $\overline{Q}_3$ at the time the circuit 85 receives the clock pulse from the NOR gate 89. That is to say, independently of the levels of the voltage shown in FIG. 18(e) which is generated at the data terminal $D_3$ of the data flip-flop circuit 85, the voltage at the output terminal $Q_3$ of the data flip-flop circuit 85 is maintained at the high level, similarly at its set time, while the voltage at its output terminal $\overline{Q}_3$ is maintained at the low level.

On the other hand, a NOR gate 82 generates at the terminal 83 a signal shown in FIG. 18(j) when the NOR gate 82 receives a signal shown in FIG. 18(i) which is generated by the sawtooth wave generating circuit 7 at the terminal 72 and the signal shown in FIG. 18(d) which is inputted to the data terminal $D_2$ of the data flip-flop circuit 84. The signal generated by the NOR gate 82 corresponds to an inverted signal of the signal shown in FIG. 18(d). The data flip-flop circuit 86 generates at its output terminal $Q_4$ the high level voltage which is being generated at the output terminal $Q_3$ of the data flip-flop circuit 85 when the high level voltage appears at the terminal 83. At this time the low level voltage is generated at the output terminal $\overline{Q}_4$ of the data flip-flop circuit 86. This low level voltage is shown in FIG. 18(h) and is the same as the voltage at the set time of the data flip-flop 86. There are applied to the NOR gate 87 an output voltage of an inverter 88 which inverts the voltage at the terminal 72, and voltages at the terminals $Q_3$ and $\overline{Q}_4$, and the voltage generated at an output terminal 90 of the NOR gate 87 as shown in FIG. 18(k) is maintained at the low level thus indicating that the distance and approaching or receding motion information does not signify the presence of a dangerous situation. When a time interval corresponding to the half period of the doppler signal (2) shown in FIG. 18(a) elapses so that the voltage at the terminal 73 goes to the high level as shown at (73) in FIG. 18(a), the data flip-flop circuit 84 is reset to become ready for analyzing the next distance and approaching or receding motion information. FIGS. 18(g), 18(h), 18(i) and 18(j) show respectively the voltage waveforms generated at terminals $\overline{Q}_3$, $\overline{Q}_4$, 72a and 83 during the above-described operation.

Next, the operation of the circuit when the target 17 is approaching toward the antenna 16 and located within a critical range will be described with reference to FIG. 19. In this case, the rate of change of the frequency of the microwave oscillator 9 in the radar circuit 26 is selected so that the distance and approaching or receding motion information wave (33b) of folded waveform of less than half period is generated at the terminal 2 as shown in FIG. 19a. Consequently, the voltages shown in FIGS. 19(b) and 19(c) are respectively generated at the terminals 80 and 81 and these voltages are respectively compared with the Schmitt levels LEV.2a and LEV.2b of the inverting Schmitt circuits 77 and 79 thereby respectively generating the signals shown in FIGS. 19(d) and 19(e) at the data terminals $D_2$ and $D_3$ of the data flip-flop circuits 84 and 85. In this case, the data flip-flop circuit 85 changes its state first so that the voltage at the output terminal $Q_3$ of the data flip-flop circuit 85 goes to the zero level to disable the NOR gate 89 to prevent the application of the clock pulses from the clock pulse generating circuit 53 to clock terminals $CL_2$ and $CL_3$ of the data flip-flop circuits 84 and 85. Simultaneously the data flip-flop circuit 85 acts on the NOR gate 87 to establish a waiting state for the distance and approaching or receding motion information to give an indication of a critical situation in which so far as the state of the data flip-flop circuit 86 remains unchanged, the voltage at the terminal 90 goes to the high level when the voltage of FIG. 19(i) generated at the terminal 72 goes to the high level. Thus, when the voltage at the terminal 72 goes to the high level as shown in FIG. 19(i) with the voltage at the data terminal $D_2$ of the data flip-flop circuit 84 remaining at the high level as shown in FIG. 19(d) and the state of the data flip-flop circuit 86 remaining unchanged, the voltage at the terminal 90 goes to the high level as shown in FIG. 19(k) to give an indication of the critical situation. FIGS. 19(f), 19(g), 19(h) and 19(j) show the voltage waveforms generated respectively at terminals $\overline{Q}_2$, $\overline{Q}_3$, $\overline{Q}_4$ and $CL_4$ during the above-described operation.

Next, the operation of the circuit when the target 17 is approaching toward the antenna 16, but it is still out of the critical range will be described with reference to FIG. 20. In this case, the distance and approaching or receding motion information wave 33c, FIG. 20(a), of folded waveform of more than half period is generated at the terminal 2 so that by the same operation as previously described for the case where the target 17 was located within the critical range, the voltage at the terminal $Q_3$ goes to the zero level first and in this condition the application of the clock pulses to the terminals $CL_2$ and $CL_3$ is interrupted. Thereafter, the voltage generated at the terminal 80 as shown in FIG. 20(b) exceeds the Schmitt level LEV.2a of the inverting Schmitt circuit 77 so that the voltage at an output terminal 83 of the NOR gate 82 goes to the high level as shown in FIG. 20(j) and hence the data flip-flop circuit 86 changes its state. Thus, even if the voltage at the terminal 72 goes to the high level as shown in FIG. 20(i), the voltage at the terminal 90 remains at the low level as shown in FIG. 20(k) thus indicating that the distance and approaching or receding motion information signifies no presence of a danger of collision. FIGS. 20(b), 20(c), 20(d), 20(e), 20(f), 20(g), 20(h), 20(i), 20(j) and 20(k) respectively show the voltage waveforms generated at the terminals 80, 81, $D_2$, $D_3$, $\overline{Q}_2$, $\overline{Q}_3$, $\overline{Q}_4$, 72a, 83 and 90.

Figure 21:
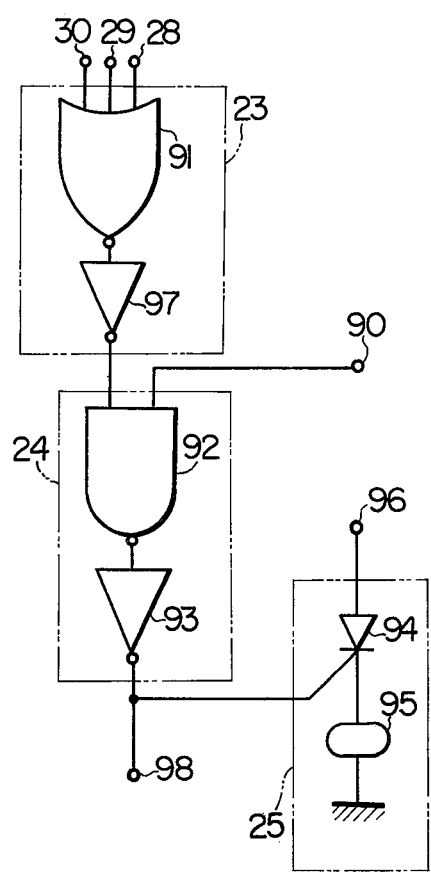

Next, the speed detecting circuit 23, the danger decision circuit 24 and the actuator circuit 25 which operate in response to the signals from the oscillator circuit group 21 and the relative state detecting circuit 22 will be described with reference to FIG. 21 showing a detailed circuit diagram thereof. In FIG. 21, numeral 91 designates a NOR gate, 92 a NAND gate, 93 and 97 inverters, 94 a silicon controlled rectifier element, 95 a detonator. Thus, when the speed signal indicated in the form of a binary number generated at the output terminals $Q_1$, $Q_2$, $Q_3$ and $Q_4$ of the reversible binary counter 31 in the oscillator circuit group 21 is higher than 0010 and the signals from the output terminals $Q_2$, $Q_3$ and $Q_4$ are applied to the terminals 30, 29 and 28 and when the voltage level at the terminal 90 representative of the distance and approaching or receding motion information gives an indication of a critical situation and goes to the high level, the detonator for actuating an air bag is exploded to cause the air bag to perform its occupant protecting function.

Figure 22:
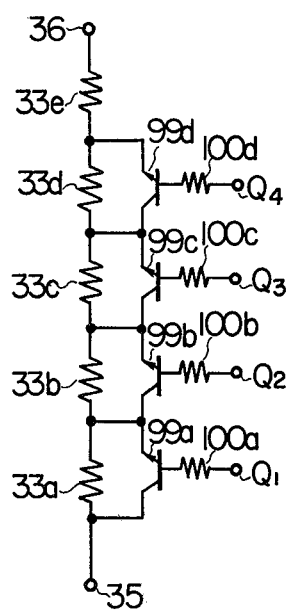
Figure 23:
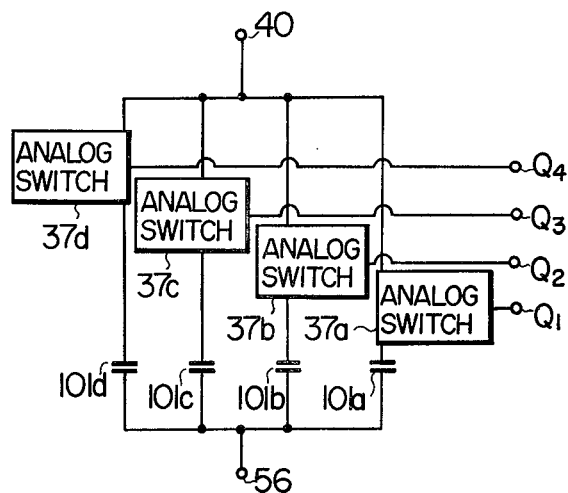
Figure 24:
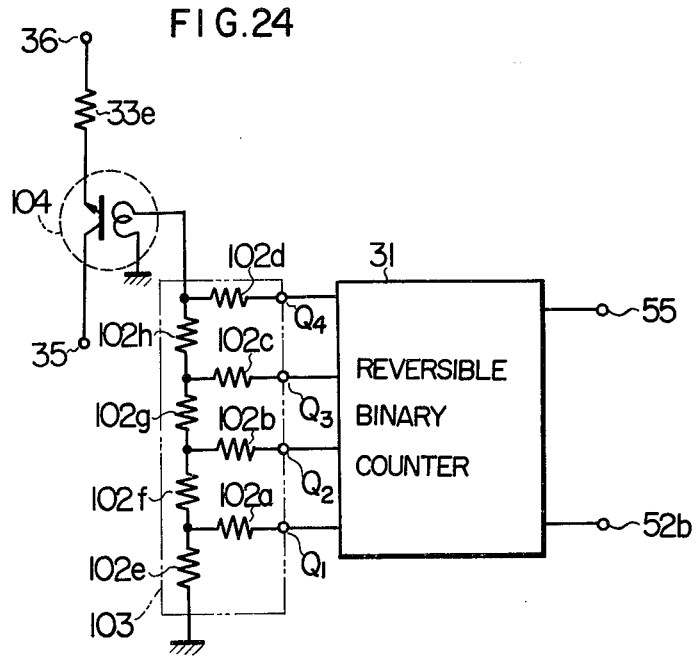
Figure 25:
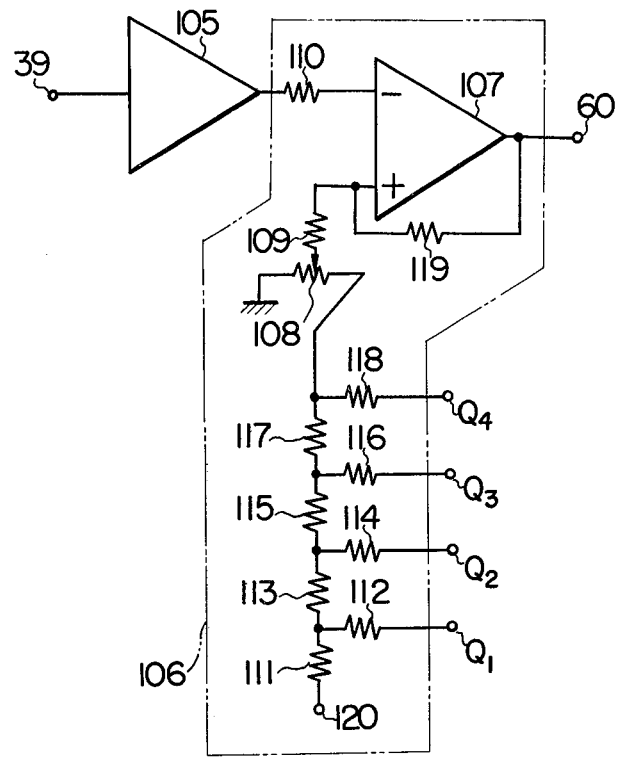

While, in the embodiment described hereinbefore, the capacitor 34 in the oscillator circuit group 21 has a fixed capacitance and the resistors 33a, 33b, 33c, 33d, and 33e and the analog switches 37a, 37b, 37c and 37d constitute a resistor network, the similar effect may be obtained by using transistors 99a, 99b, 99c and 99d and resistors 100a, 100b, 100c and 100d in place of the analog switches 37a, 37b, 37c and 37d as shown in FIG. 22. Further, as shown in FIG. 23, a similar effect may also be obtained by using a fixed resistance value and replacing the resistor network with a capacitor network comprising capacitors 101a, 101b, 101c and 101d and the analog switches 37a, 37b, 37c and 37d. Still further, a similar effect may be obtained by an arrangement in which a ladder resistor network 103 comprising resistors 102a, 102b, 102c, 102d, 102e, 102f, 102g and 102h is connected to the output terminals $Q_1$, $Q_2$, $Q_3$ and $Q_4$ of the reversible binary counter 31 and a photo coupler 104 is connected to the output terminal of the ladder resistor network 103 as shown in FIG. 24. Still further, it is possible to obtain the similar effect by an arrangement in which the photo coupler 104 is replaced with an MOS FET transistor or a rotary machine controlled by the output voltage of the ladder resistor network 103 and a variable resistor whose resistance value corresponds to the rotational angle of the rotating machine. FIG. 25 shows still another modification of the oscillator circuit group 21 wherein the frequency of the wave signal from the microwave oscillator 9 is changed rapidly and linearly with time in accordance with a timing which includes the phase difference dependent on the function corresponding to the frequency of the doppler signal and in this way the distance and approaching or receding motion information wave is provided with a weight corresponding to the relative speed between the vehicle and the target 17. In FIG. 25, numerals 105 and 106 designate respectively an amplifier connected between the termianls 39 and 60 in place of the inverting Schmitt circuit 44 shown in FIG. 10 and an inverting Schmitt circuit whose Schmitt level corresponds to the binary number represented at the output terminals $Q_1$, $Q_2$, $Q_3$ and $Q_4$ of the reversible binary counter 31, 107 an operational amplifier, 108 a variable resistor, 109, 110, 111, 112, 113, 114, 115, 116, 117, 118 and 119 resistors, 120 a negative power supply terminal to which a negative voltage is applied.

We claim:

1. A collision predicting operation system comprising:
   electromagnetic wave generating means whose oscillation frequency is varied in accordance with an input voltage thereto;
   antenna means for radiating said electromagnetic wave and for receiving a reflected wave reflected from a target due to the encounter of said electromagnetic wave with said target;
   means for causing said reflected wave to interfere with a part of said electromagnetic wave to generate a doppler signal;
   periodic wave generating means connected to said doppler signal generating means and including circuitry responsive only to a doppler signal having an amplitude higher than a predetermined value and a frequency within a predetermined range to produce a periodic wave synchronized with said doppler signal and having a rise portion occurring when the phase angle of the doppler signal is zero;
   frequency modulating means connected to said electromagnetic wave generating means and said periodic wave generating means, said frequency modulating means including circuit means response to the rise of said periodic wave for changing the input voltage to said electromagnetic wave generating means in synchronization with the occurrence of said zero phase angle of said doppler signal thereby changing the oscillation frequency of said electromagnetic wave generating means; and
   means for detecting the polarity and phase of the modulated portion of said doppler signal.

2. A collision predicting operation system according to claim 1, wherein the circuitry of said periodic wave generating means comprises:
   a first multiplier for performing a multiplication of said doppler signal and a first periodically occurring wave;
   a first low-pass filter connected to said first multiplier;
   first level detecting means for generating a signal when the output of said first low-pass filter is higher than a predetermined value;
   a second multiplier for performing a multiplication of said doppler signal and a second periodically occurring wave which is 90° out of phase with said first occurring wave;
   a second low-pass filter connected to said second multiplier, second level detecting means for generating a signal when the output of said second low-pass filter is higher than a predetermined value, an oscillator for changing the frequency of said first and second periodically occurring waves in accordance with the output of said first low-pass filter and the polarity thereof;
   and a control circuit connected to said first and second level detecting means for further controlling said oscillator in accordance with the level signals from said first and second level detecting means to cause the phases of said second periodically occurring wave and said doppler signal to differ substantially by 180° from each other.

3. A collision predicting operation system according to claim 1, wherein the circuitry of said periodic wave generating means includes:
   an oscillator whose oscillation frequency and phase are adjustable; and
   means for causing the frequency and phase of an oscillation signal generated by said oscillator to coincide with those of said doppler signal.

4. A collision predicting operation system comprising:
   transmitting means for radiating a transmission wave towards a target;
   antenna means for receiving a reflected wave reflected from said target;
   interference means connected to said transmitting means and said antenna for causing said reflected wave received by said antenna to interfere with a part of said transmission wave branched from said transmission wave to obtain a doppler signal;
   periodic wave generating means connected to said interference means and including circuitry responsive only to a doppler signal having an amplitude higher than a predetermined value and a frequency within a predetermined range, said circuitry including an oscillator whose oscillation frequency and phase are adjustable to obtain a periodically occurring wave whose frequency and phase coincide with those of said doppler signal, said circuitry further comprising means responsive to the periodically occurring wave to produce a periodic rectangular wave synchronized with said doppler signal and having a rise portion occurring when the phase angle of the doppler signal is zero;
   frequency modulating means, including circuit means responsive to said periodic rectangular wave from said periodic wave generating means, for modulating the frequency of said transmission wave in synchronization with the occurrence of said zero phase angle of said doppler signal; and
   means connected to said frequency modulating means for detecting the polarity and phase of the modulated portion of said doppler signal.

* * * * *